(12) United States Patent
Jeong

(10) Patent No.: US 11,727,089 B2
(45) Date of Patent: Aug. 15, 2023

(54) MODULAR MACHINE LEARNING SYSTEMS AND METHODS

(71) Applicant: Nasdaq, Inc., New York, NY (US)

(72) Inventor: Hyunsoo Jeong, Boston, MA (US)

(73) Assignee: NASDAQ, INC., New York, NY (US)

( * ) Notice: Subject to any disclaimer, the term of this patent is extended or adjusted under 35 U.S.C. 154(b) by 281 days.

(21) Appl. No.: 17/014,846

(22) Filed: Sep. 8, 2020

(65) Prior Publication Data

US 2022/0076081 A1    Mar. 10, 2022

(51) Int. Cl.

| | | |
|---|---|---|
| *G06F 18/241* | (2023.01) | |
| *G06N 20/20* | (2019.01) | |
| *G06F 18/214* | (2023.01) | |
| *G06F 18/21* | (2023.01) | |
| *G06N 3/08* | (2023.01) | |
| *G06N 20/10* | (2019.01) | |
| *G06N 5/01* | (2023.01) | |
| *G06N 7/01* | (2023.01) | |

(52) U.S. Cl.
CPC .......... *G06F 18/241* (2023.01); *G06F 18/214* (2023.01); *G06F 18/217* (2023.01); *G06N 20/20* (2019.01); *G06N 3/08* (2013.01); *G06N 5/01* (2023.01); *G06N 7/01* (2023.01); *G06N 20/10* (2019.01)

(58) Field of Classification Search
CPC .. G06K 9/6256; G06K 9/6262; G06K 9/6268; G06N 20/00; G06N 20/10; G06N 20/20; G06N 3/02; G06N 3/08; G06N 5/00; G06N 5/003; G06N 5/025; G06N 5/045; G06N 5/047; G06N 7/005; G06N 5/01; G06N 7/01; G06F 18/241; G06F 18/214; G06F 18/217
See application file for complete search history.

(56) References Cited

U.S. PATENT DOCUMENTS

| | | |
|---|---|---|
| 2009/0043720 A1 | 2/2009 | Reznik et al. |
| 2009/0116737 A1 | 5/2009 | Kiraly et al. |
| 2011/0145178 A1 | 6/2011 | Schmidtler et al. |
| 2015/0170055 A1 | 6/2015 | Beymer et al. |
| 2018/0300576 A1 | 10/2018 | Dalyac et al. |
| 2020/0092159 A1* | 3/2020 | Thampy ................. H04B 17/23 |
| 2021/0158041 A1* | 5/2021 | Chowdhary ........... G05D 1/027 |

(Continued)

OTHER PUBLICATIONS

Baumel et al. "Multi-Label Classification of Patient Notes: Case Study on ICD Code Assignment", The Workshops of the Thirty-Second AAAI Conference on Artificial Intelligence, 2018, pp. 409-416, Retrieved on Sep. 10, 2021 from URL: <https://www.aaai.org/ocs/index.php/WS/AAAIW18/paper/view/16881/15610>.

(Continued)

*Primary Examiner* — Shane D Woolwine
(74) *Attorney, Agent, or Firm* — Nixon & Vanderhye P.C.

(57) ABSTRACT

A computer system is provided that is designed to handle multi-label classification. The computer system includes multiple processing instances that are arranged in a hierarchal manner and execute differently trained classification models. The classification task of one processing instance and the executed model therein may rely on the results of classification performed by another processing instance. Each of the models may be associated with a different threshold value that is used to binarize the probability output from the classification model.

20 Claims, 7 Drawing Sheets

(56) References Cited

U.S. PATENT DOCUMENTS

2021/0295213 A1\* 9/2021 Raveh .................. G06V 10/764
2022/0058496 A1\* 2/2022 Rusk ....................... G06F 40/30

OTHER PUBLICATIONS

International Search Report and Written Opinion of the ISA for International Application No. PCT/US2021/044863, 11 pages, dated Nov. 5, 2021.

\* cited by examiner

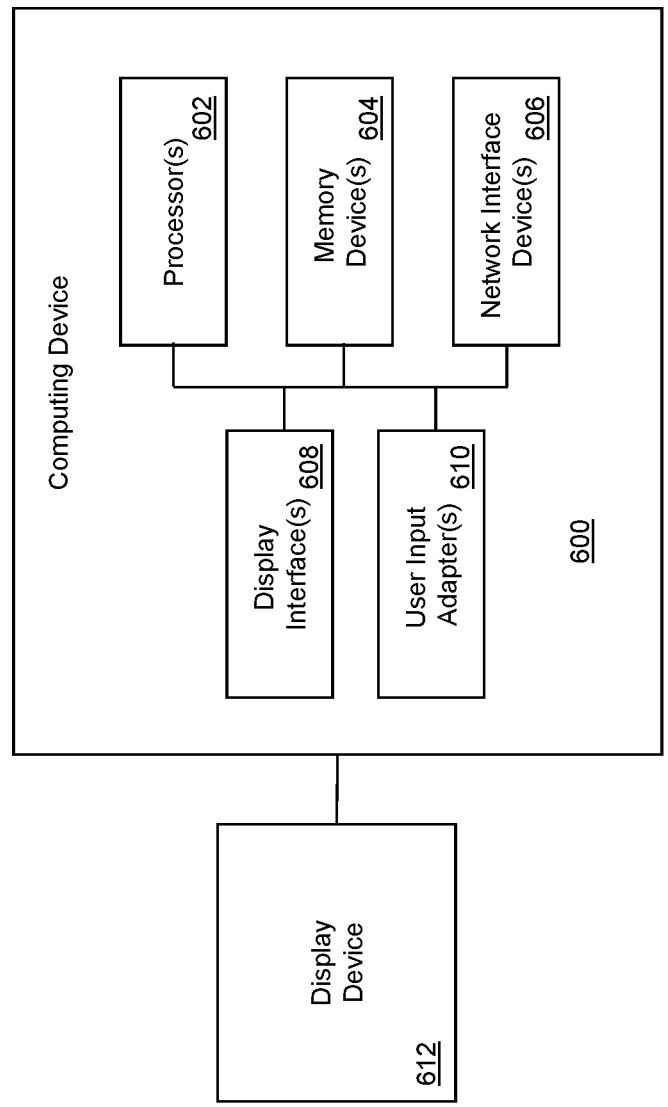

MODULAR MACHINE LEARNING SYSTEMS AND METHODS

CROSS REFERENCE(S) TO RELATED APPLICATION(S)

Not applicable.

TECHNICAL OVERVIEW

The technology described herein relates to machine learning techniques. More particularly, the technology described herein relates to multi-label problems in machine learning and modularization of machine learning tasks.

INTRODUCTION

Machine and deep learning can give computers the ability "learn" a specific task without expressly programming the computer for that task. This may be accomplished by developing a model (e.g., a mathematical model) based on initial data and then using that model to assess new data. For example, a model may be developed to automatically recognize and distinguish between photos that contain dogs and photos that contain cats. The model can then be used to form a prediction as to whether a given photo contains a cat or a dog. Such classifications problems can be viewed as binary and/or mutually exclusive (e.g., the photo contains a dog or a cat).

But more complex tasks often cannot rely on the input data being neatly classified into only a set number of bins (e.g., a dog or a cat). For example, the task of labeling newspaper articles based on the content of the article (e.g., business, fashion, politics, etc.). Some articles may only be classified with one label, while others could have 3 or 4 (e.g., an article that combines business, politics, and technology). Such multi-classification may be complex machine learning problems due to the how the classifier (the model) needs to be trained to handle all of the possible classification combinations.

Accordingly, it will be appreciated that new and improved techniques, systems, and processes are continually sought after in machine and deep learning. Such techniques may include new and improved techniques in the area of developing models and, in particular, in the area of developing models that can handle classification problems, including multi-label classifications problems.

SUMMARY

In certain example embodiments, a computer system is provided that is designed to handle multi-label classification. The computer system includes multiple processing instances that share a common code base (e.g., a single module may be reused as the basis for the distinct instances), but each processing instance may run a different model that is individually trained to classify one or more labels to an input dataset (such as a group of documents). Each model may be trained to make different classification predictions.

In certain example embodiments, the processing instances may be arranged within the computer system in a hierarchical or other structured manner such that the output from one processing instance (e.g., the model run by that processing instance) may be used as input for another processing instance and its different model. Accordingly, the classification of data by a first model may rely on the labeled data from a second model.

In certain example embodiments, each of the models may be assigned with a corresponding threshold value that is used to determine, from the probability output from the classification model, whether a label should be assigned to a given piece of data within a dataset (e.g., each member of that dataset, such as a document, image, or the like). Each corresponding threshold value may be generated by analyzing the performance of each corresponding model. Thus, each model may have a different threshold value that is used to binarize the probability output from that model.

In certain example embodiments, models may be continually updated as datasets are labeled and then subsequently verified. The verified and labeled data may be used to train (or retrain) future models.

This Summary is provided to introduce a selection of concepts that are further described below in the Detailed Description. This Summary is intended neither to identify key features or essential features of the claimed subject matter, nor to be used to limit the scope of the claimed subject matter; rather, this Summary is intended to provide an overview of the subject matter described in this document. Accordingly, it will be appreciated that the above-described features are merely examples, and that other features, aspects, and advantages of the subject matter described herein will become apparent from the following Detailed Description, Figures, and Claims.

BRIEF DESCRIPTION OF THE DRAWINGS

These and other features and advantages will be better and more completely understood by referring to the following detailed description of example non-limiting illustrative embodiments in conjunction with the drawings of which:

FIG. 6 shows an example computing device that may be used in some embodiments to implement features described herein.

DETAILED DESCRIPTION

In the following description, for purposes of explanation and non-limitation, specific details are set forth, such as particular nodes, functional entities, techniques, protocols, etc. in order to provide an understanding of the described technology. It will be apparent to one skilled in the art that other embodiments may be practiced apart from the specific details described below. In other instances, detailed descriptions of well-known methods, devices, techniques, etc. are omitted so as not to obscure the description with unnecessary detail.

Sections are used in this Detailed Description solely in order to orient the reader as to the general subject matter of each section; as will be seen below, the description of many features spans multiple sections, and headings should not be read as affecting the meaning of the description included in any section.

Overview

In certain example embodiments, a computer system is provided that is designed to handle multi-label classification. The computer system includes multiple processing instances that may share a common code base (e.g., each of the processing instances may be distinct instantiations of the same software module or software code). The multiple processing instances may each execute or process a different model that has been individually trained to classify one or more labels to an input dataset (such as a group of documents). The processing instances of the computer system may be arranged in a hierarchical or other structured manner such that the output from one processing instance (and the corresponding model) may be used as input for another. Thus, the classification performed by one model may rely on the results of classification performed by another model. In certain example embodiments, each of the models may use a different threshold value that is used to determine, from the probability output from the classification model, whether a label should be assigned to a given member within a dataset (e.g., a document or the like).

Figure 1:
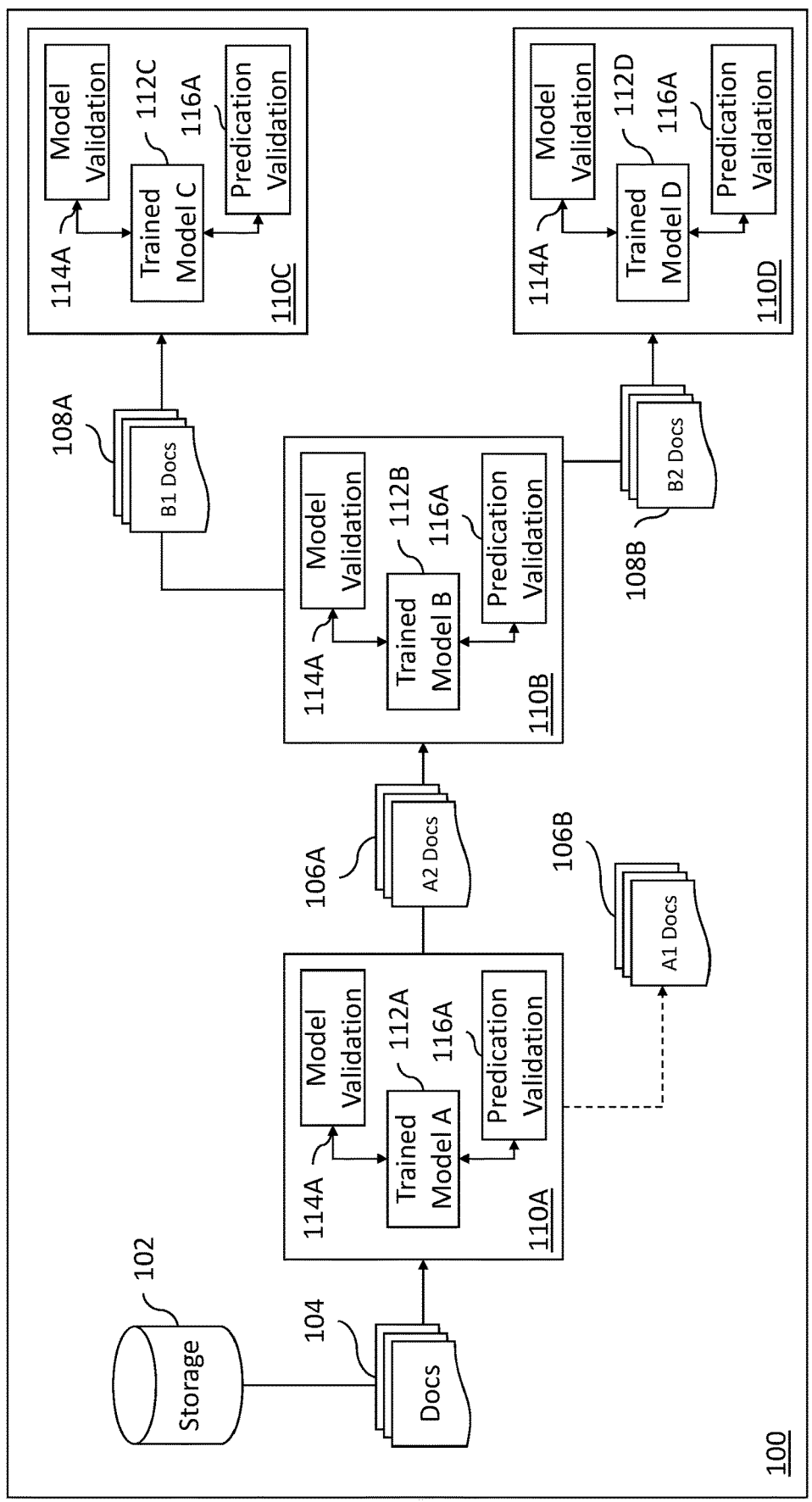
FIG. 1 is a diagram of an example computer system configured to handle multi-label processing by using multiple different models according to certain example embodiments.
Figure 2A:
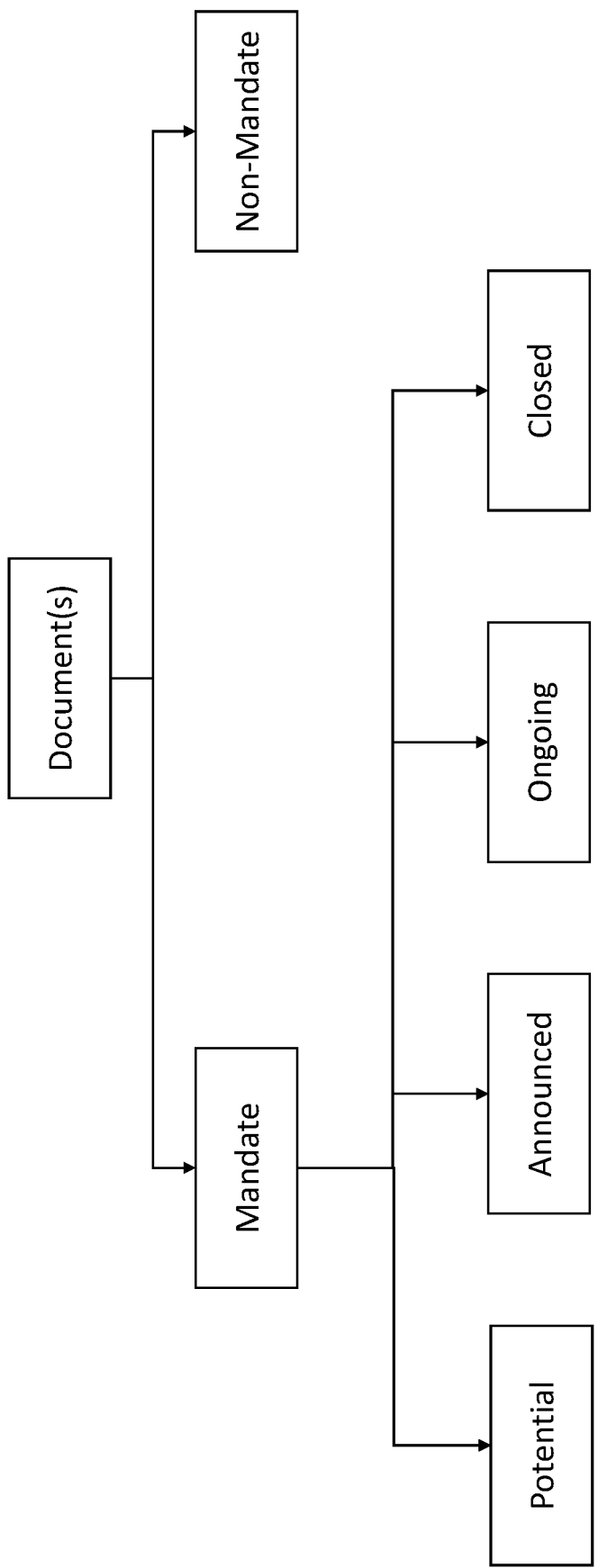
FIGS. 2A-2B are diagrams that illustrate example labels that may be assigned to documents processed by using the system shown in FIG. 1 according to certain example embodiments.
Figure 2B:
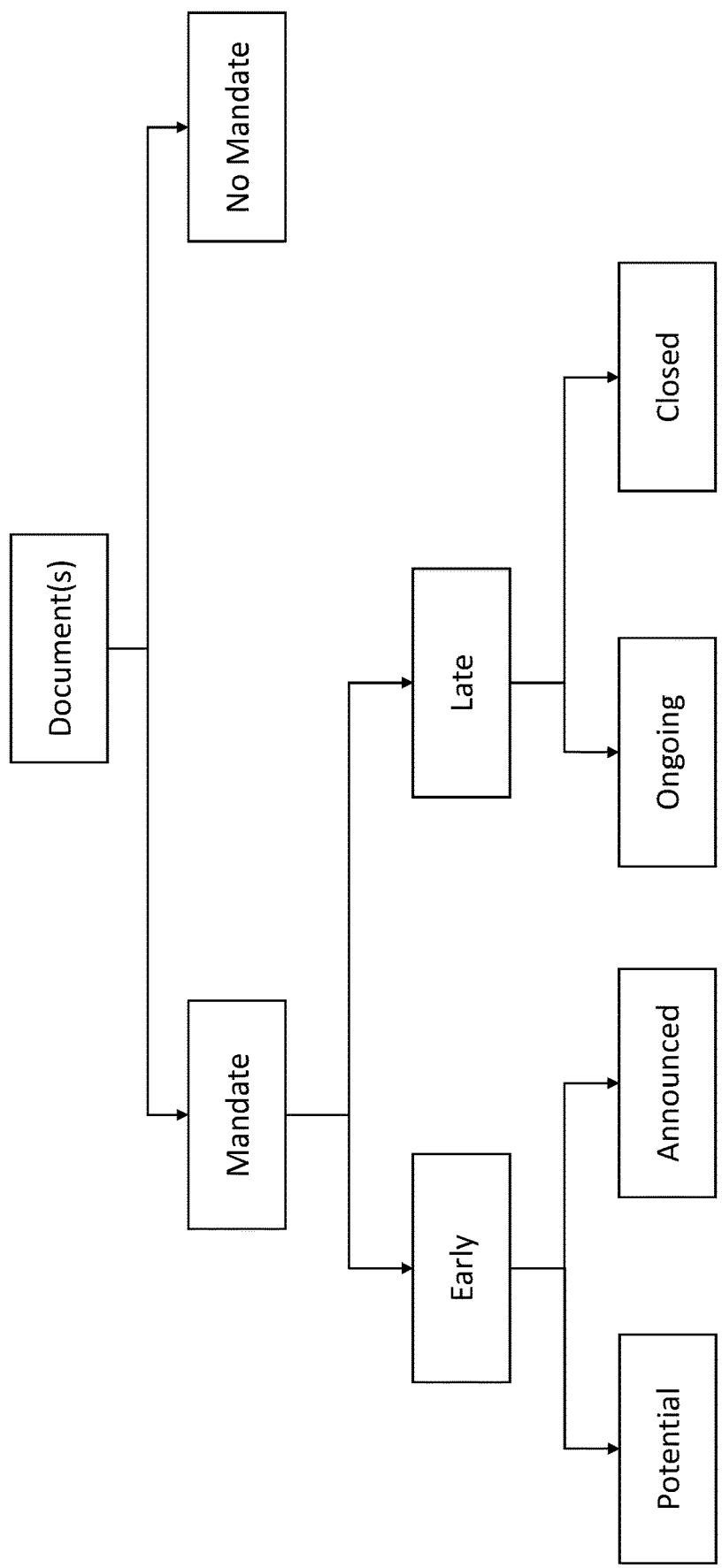
Figure 3:
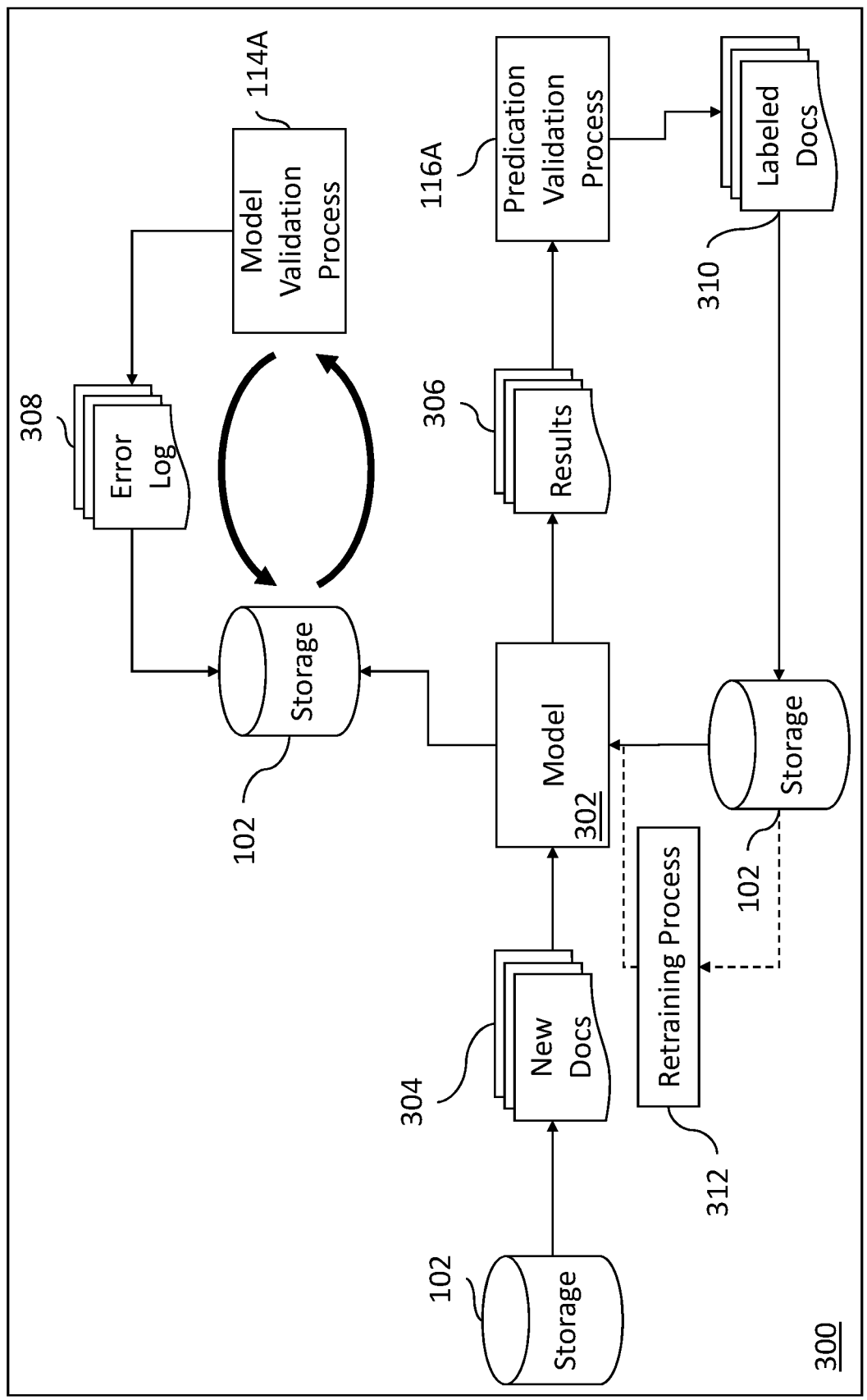
FIG. 3 is a process flow diagram that illustrates an example of how documents are analyzed according to certain example embodiments.
Figure 4:
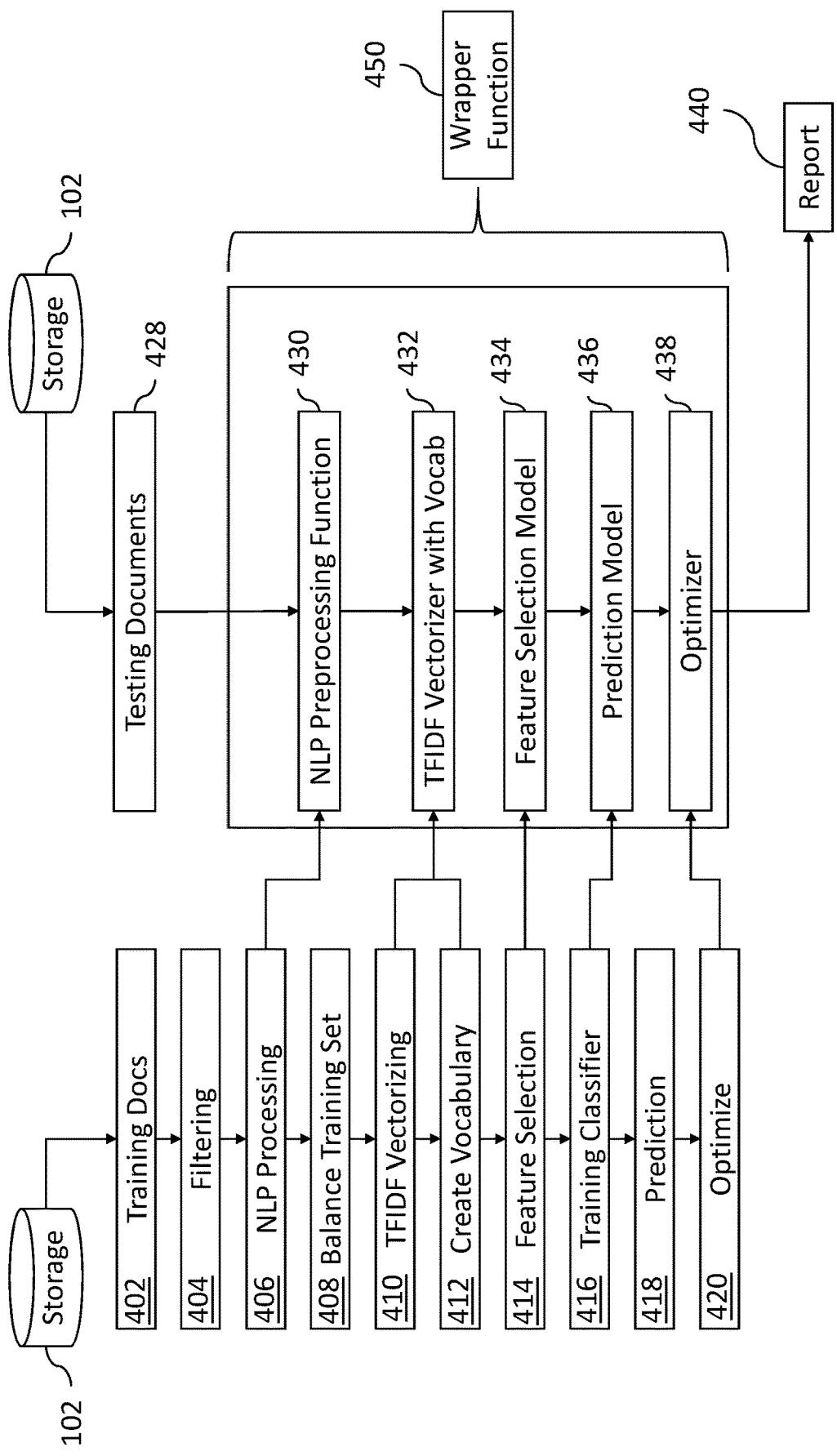
FIG. 4 is a process diagram that shows how a model is trained and then used to make predictions on new data according to certain example embodiments.
Figure 5:
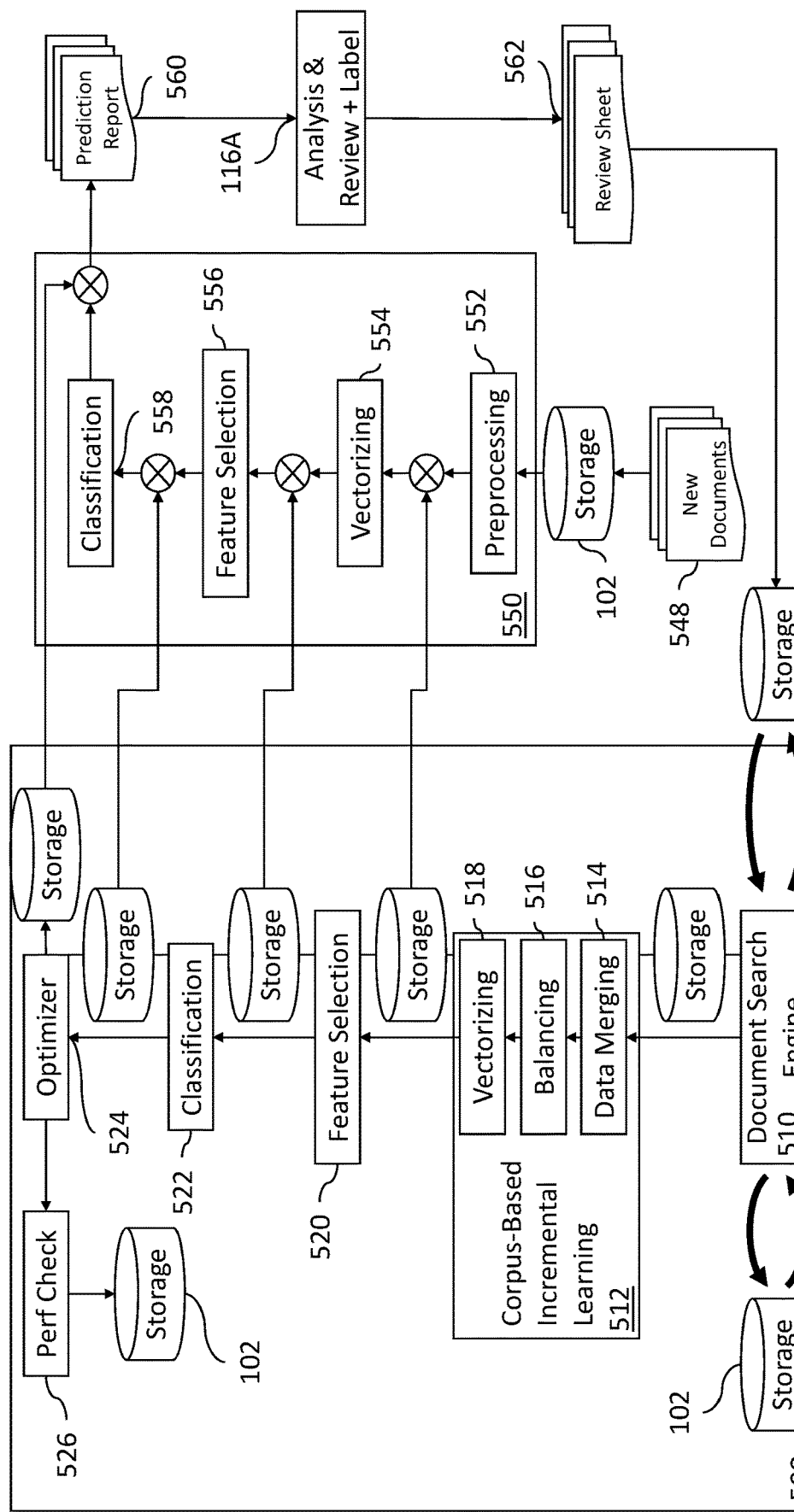
FIG. 5 is a diagram of a system that is used to (re)train models and make classification predications according to certain example embodiments.

FIG. 1 shows an example computer system that is configured to handle multi-label classification and illustrates four separate models that are handled by respective processing instances of the computer system. FIGS. 2A-2B are diagrams that illustrate multi-label scenarios that may be applied to the system shown in FIG. 1. FIG. 3 illustrates a process for how each of the models shown in FIG. 1 may operate within a given processing instance. FIG. 4 is a flow chart that illustrates how models used in the system shown in FIG. 1 may be trained and then used. FIG. 5 is an architectural diagram of how each processing instance (e.g., as shown in FIG. 1) may be arranged for (re)training models and making classification predications according to certain example embodiments. FIG. 6 shows an example of a computing device that may be used to implement features described herein.

In many places in this document, including but not limited to the description of FIGS. 1-5, software modules, engines, generators, evaluators, extractors, processes, and actions performed by software are described. This is done for ease of description; it should be understood that, whenever it is described in this document that software or a module thereof performs any action, the action is in actuality performed by underlying hardware elements (such as a processor and a memory device) according to the instructions that comprise the software (or the like). Further details regarding this are provided below in, among other places, the description of FIG. 6.

Description of FIG. 1

FIG. 1 is a diagram of an example computer system 100 configured to handle multi-label processing by using differently trained models to perform labeling of input data from a dataset (e.g., documents, images, videos, etc.). Computer system 100 includes storage 102 and multiple different processing instances (e.g., 110A-110D) that each include or use a model (e.g., 112A-112D) that is used to label documents 104 (or other types of data) according the specific model for that processing instance.

An example of computer system 100 includes computing device 600, which is described in connection with FIG. 6. In certain examples, computer system 100 is comprised of multiple different instances of computing device 600. For example, computer system 100 may be a cloud-based computer system that includes many different nodes (e.g., each being a different instance of computing device 600). In certain examples, each model (e.g., each processing instance 110A-110D) is executed by using a computing device 600 and/or within its own virtual environment (e.g., a virtual machine or virtual container, such as virtual containers created and/or managed by Kubernetes or the like).

Computer system 100 includes computer storage 102 that (as discussed elsewhere herein) may store data that includes data for training models, trained models, new data for making predications, the results of classifying data (e.g., reports), model information and other data that is used to run the models. Computer storage 102 (also call electronic data storage or a computer storage system) includes hardware elements (such as memory devices 604 or the like). In certain example embodiments, computer storage 102 may be, for example, Amazon's Simple Storage Service (S3) that is available as part of AWS. Accordingly, computer storage 102 may also include, in certain examples (e.g., in addition to the hardware elements), computer interfaces (e.g., an API, etc.) to access the data stored on such hardware elements. In certain examples, computer storage 102 may be a database or flat file that is stored on non-transitory storage. In certain examples, different or the same types of data may be stored in different types of storage (e.g., some data may be stored in S3 and other data in a dedicated flat file or database).

Processing instances 110A-110D may be generally similar in nature in that the model validation processing 114A and/or predication validation processing 116A may be the same between the different processing instances 110A-110D (and others that may be used in connection with certain example embodiments). Thus, for example, the processing shown and discussed in connection with any or all of FIGS. 3-5 may be repeated within each processing instance. In certain example embodiments, processing instances may share predication validation or model validation processing. In certain examples, model and/or predication validation may be a service that is executed in a different virtual environment or different computing device (e.g., different from the processing instance that is executing the corresponding model).

In certain example embodiments, the processing instances are arranged in a hierarchal manner such that some (or nearly all, except for leaf nodes) of the results or output from the processing instances are used as input or the data for another processing instance. Thus, for example, trained model A in processing instance 110A is configured to assign labels A1 and A2 (e.g., make a prediction) regarding documents 104. The documents that are then assigned with label A2 (106A), which are then used as input for processing instance 110B (e.g., the portion of documents 104 that have been assigned label A2). In the example shown in FIG. 1, the documents assigned with the A1 label (106B) are not used for further processing. However, in other examples, such documents may then be used as input for additional processing instances and their corresponding models (e.g., beyond those shown in FIG. 1).

It will be appreciated that the output from the model for the assignment of a label to a given member of a dataset (e.g., a document, an image, or the like) may be viewed as the model a making a predication as to the likelihood that the given label should be assigned to the data in question. As discussed elsewhere herein, this prediction may then be translated into a binary value (e.g., "yes" if the label applies or "no" if it does not).

Returning to FIG. 1, output from processing instance 110B may be those documents (e.g., zero or more) that are determined to have a B1 label (108A) and those (e.g., zero or more) with a B2 label (108B). Processing instances 110C and 110D may then process the incoming documents that are relevant to those models (112C and 112D) to make yet further predictions. Thus, the portion of the original docs 104 that have labels A2 and B1 are processed by 110C and model 112C while the portion of the original docs 104 that have labels A2 and B2 are processed by 110D and model 112D. The hierarchical processing may then continue with the outputs from the various processing instances (and their corresponding models) used as input to yet additional processing instances (and differently trained models).

Description of FIGS. 2A-2B

Multi-label processing in machine learning is a technical problem that addresses (potentially) assigning multiple different (and non-mutually exclusive) labels to a given piece of data (e.g., a document, image, video, etc.). An example of multi-label processing relates to analyzing documents for themes or keywords. An example scenario discussed herein relates to analyzing documents to determine whether a "mandate" signal (e.g., whether the document discusses taking an action) is present.

FIG. 2A provides an illustrative example of how multiple labels for an example process may be arranged. The documents may be split into positive and negative labels—e.g., those labeled with a mandate signal and those labeled with a non-mandate signal. In certain instances, these may be mutually exclusive. A document with a mandate signal may be further classified based on specific characteristics of the mandate(s) identified in the document, for example whether an identified mandate is (1) "potential" (i.e., it is not certain that the action will be taken, but it is possible), (2) "announced" (i.e., it has been announced that the action will be taken), (3) "ongoing" (i.e., the action is in process), or (4) "closed" (i.e., the action has been completed). While there are only four different labels in this example, it is possible (because of the status/timing surrounding a particular mandate, and/or because a given document may include information related to multiple mandates), that a document may be associated with various combinations of these labels; for example, a document could be labeled with ongoing, potential, and announced or with announced and ongoing. Thus, the number of potential classifications is greater than 4 and may instead be closer to 10-20. Of course, as the number of potential labels grow, the potential classifications of those combinations may grow (e.g., exponentially). Thus, if there are, for example, 16 potential labels that could be applied to a document, there could be hundreds of different label combinations that could be assigned to a given piece of data.

Training a model to effectively handle such combinations can be difficult. This difficulty may be further increased if the labels (e.g., each class) are not mutually exclusive and/or imbalanced in occurrence (for example there are relatively few fraud cases amongst the total number of cases). For example, if the class of ongoing, potential, and announced (e.g., all three labels apply to a given document) is rather rare (e.g., less than 0.1% for example), then it may be difficult to effectively train a model to identify such a class amongst the overall data space.

In terms of the labels provided in FIG. 2A, the following table provides an illustrative balance (or imbalance) of the different classes against an example document set.

TABLE 1

| Class | Occurrence Count |
| --- | --- |
| Non-Mandate | 25636 |
| Completed | 2708 |
| Potential | 977 |
| Ongoing | 833 |
| Announced | 433 |
| Completed, Potential | 81 |
| Completed, Ongoing | 51 |
| Ongoing, Potential | 50 |
| Announced, Potential | 32 |
| Announced, Ongoing | 15 |
| Announced, Completed | 11 |
| Completed, Ongoing, Potential | 9 |
| Announced, Completed, Ongoing | 3 |
| Announced, Completed, Potential | 3 |
| Announced, Ongoing, Potential | 2 |
| Announced, Completed, Ongoing, Potential | 2 |

When machine learned models (e.g., that are used to make predications) are trained, the effectiveness of such models may be judged based on the "recall" metric. Recall is the number of true positives divided by the sum of the true positives and false negatives (TP/(TP+FN)). Thus, a recall metric of 1 would have zero false negatives. A recall metric may be relevant in situations when identifying instances that tend to occur less frequently (e.g., parts failure, detection of fraud, or other facts that generally occur infrequently). This is because it can be important to catch every (or almost every) possible fraud/failure (e.g., instances that may occur relatively infrequently within a given dataset) even if some false positives may also be caught.

Other metrics may also be used to determine or calculate the effectiveness of a given model. In certain example embodiments, a confusion matrix and the metrics that may be derived from such a matrix may be used to determine one or more metrics (including recall). For example, the following table provides an illustrative confusion matrix for an example model:

TABLE 2

| | | Predicated | | |
| --- | --- | --- | --- | --- |
| | | 0 | 1 | |
| Actual | 0 | 1997(TN) | 584 (FP) | 2581 |
| | 1 | 97 (FN) | 433 (TP) | 504 |
| | | 2068 | 1017 | |

The following metrics may be calculated form the above confusion matrix, with TP being true positives, TN being true negatives, FN being false negatives, and FP being false positives:

TABLE 3

| Recall | TP/(TP + FN) | 0.85 |
| --- | --- | --- |
| Precision | TP/(TP + FP) | 0.42 |
| Accuracy | (TP + TN)/ (TP + TN + FP + FN) | 0.78 |
| Balanced Accuracy | (TPR + TNR)/2 | 0.81 |
| Sensitivity (=Recall) | TPR = TP/(TP + FN) | 0.85 |
| Specificity | TNR = TN/(TN + FP) | 0.77 |
| F1 (harmonic mean of precision and recall) = 2 * (Precision * Recall)/ (Precision + Recall) | | 0.56 |

Thus, in this case, the precision metric of the model may be relatively low (e.g., 0.48). However, if the "cost" of following up and checking an error is not expensive (e.g., in terms of computing resources, processing power, memory, bandwidth, or the like or in terms of human time), then such a low precision may be acceptable. Thus, certain example embodiments may operate to decrease or minimize the FN (false negatives). Similarly, the FP number may not be as relevant in certain examples. However, in certain examples and where applicable to the given problem, decreasing the FP may be more advantageous (e.g., where having a false positive is expensive, but having a false negative is not).

Determining the performance of a model that is used to handle multi-label problems can be more difficult due to the increasing number of non-mutually exclusive outputs from the model. The following are metrics from different example models trained to handle an illustrative multi-label prediction problem.

TABLE 4

| Micro Average | | | |
|---|---|---|---|
| Model | Precision | Recall | F-Score |
| RandomForestClassifier | 0.67 | 0.51 | 0.58 |
| KNeighborsClassifier | 0.77 | 0.52 | 0.62 |
| DecisionTreeClassifier | 0.64 | 0.64 | 0.64 |
| ExtraTreesClassifier | 0.74 | 0.51 | 0.60 |
| RadiusNeighborsClassifier | 0.55 | 0.52 | 0.53 |
| MLPClassifier | 0.76 | 0.70 | 0.73 |

TABLE 5

| Macro Average | | | |
|---|---|---|---|
| Model | Precision | Recall | F-Score |
| RandomForestClassifier | 0.54 | 0.28 | 0.27 |
| KNeighborsClassifier | 0.70 | 0.42 | 0.51 |
| DecisionTreeClassifier | 0.55 | 0.55 | 0.55 |
| ExtraTreesClassifier | 0.77 | 0.27 | 0.29 |
| RadiusNeighborsClassifier | 0.14 | 0.25 | 0.18 |
| MLPClassifier | 0.70 | 0.60 | 0.65 |

As illustrated in the two above tables, the recall metric does not go above 70% for any of the trained models. This is in contrast with the recall metric shown in Tables 2/3 (which related to a simpler classification task).

Turning to FIG. 2B, in certain example embodiments, another approach for handling multi-label processing in machine learning may be used. Specifically, in certain example embodiments, the multiple labels are translated into a hierarchal form. In certain example embodiments and as shown in FIG. 2B, this hierarchal form may include arranging the labels in a binary hierarchy or tree form. Thus, for example, the potential and announced labels, in contrast to the approach shown in FIG. 2A, now have a parent "early" label that is created as a parent for those labels. Similarly, the ongoing and closed labels are put under a new "late" label that is the parent for those labels. Note that the "No Mandate" label does not have any child labels as documents with no mandate are of no further interest for this illustrative example. However, in certain examples, there may be other labels that are used in conjunction with the no mandate label. Additionally, in certain example embodiments, the leaf labels shown in FIG. 2B may themselves have further child labels (e.g., "Announced" may have two labels as children).

The approach to structurally organizing the various labels that can be applied to the data by the differently trained models, as discussed elsewhere herein, can provide for greater efficiencies and/or accuracy in developing and running a system that uses machine learned models to label and/or classify data (e.g., documents, images, video, datasets, etc.). As discussed in greater detailed herein, different models can be trained to label data according to each of the paired children labels. Thus, for example, one model can label data as mandate/non-mandate, another as early/late, another as potential/announced, and so on.

In certain examples other types of arrangements (e.g., besides a binary tree) may be used to arrange the processing instances and the corresponding classification modes. For example, the hierarchical structure of the models may not be binary in nature. Rather, the models and processing instances may be structured such that each node has between 1 and 4 children, or between 1 and some greater amount.

Description of FIG. 3

FIG. 3 is a process flow diagram that illustrates how documents are analyzed by processing instance 300 according to certain example embodiments.

Processing instance 300 includes a model 302 that processed by the respective processing instance. Examples of processing instance 300 include processing instances 110A-110D as shown in FIG. 1. Examples of model 302 include trained models 112A-112D (e.g., classification models) in FIG. 1.

Each model may be stored in storage 102. When documents are to be processed by model 302 the model is loaded from storage 102 and new documents 304 are then applied to model to generate results 306 (e.g., the predictions for the classification—whether a given label applies to a model). The following is an example output of results 306 based on applying a sample set of documents against an illustrative model.

TABLE 6

| # | Probability Score | With 0.5 Threshold | With Generated Threshold |
|---|---|---|---|
| 1 | 0.999986413 | 1 | 1 |
| 2 | 0.947771602 | 1 | 1 |
| 3 | 0.915035601 | 1 | 1 |
| 4 | 0.884980061 | 1 | 1 |
| 5 | 0.842306725 | 1 | 1 |
| 6 | 0.812511819 | 1 | 1 |
| 7 | 0.777013465 | 1 | 1 |
| 8 | 0.680954618 | 1 | 1 |
| 9 | 0.65029741 | 1 | 1 |
| 10 | 0.612091179 | 1 | 1 |
| 11 | 0.581253397 | 1 | 1 |
| 12 | 0.500219273 | 1 | 1 |
| 13 | 0.467308054 | 0 | 1 |
| 14 | 0.430009659 | 0 | 1 |
| 15 | 0.388127866 | 0 | 0 |
| 16 | 0.334169524 | 0 | 0 |
| 17 | 0.277311257 | 0 | 0 |
| 18 | 0.241859081 | 0 | 0 |
| 19 | 0.209187905 | 0 | 0 |
| 20 | 0.184382964 | 0 | 0 |
| 21 | 0.124923782 | 0 | 0 |
| 22 | 0.096562678 | 0 | 0 |
| 23 | 0.028281648 | 0 | 0 |
| 24 | 0.000196678 | 0 | 0 |

These results include the "raw" output from applying the documents to the model (e.g., a classification probability value or a probability score) and a binary value that reflects whether the label should be applied to the given document. The first of these is using a flat 0.5 threshold. The second column uses a generated threshold value that is discussed in greater detail below. As shown above, the generated threshold value may be different from using a preset threshold (e.g., of 0.5). The results may include both the probability and the binary value, or just the binary value (e.g., after having the probability applied against a given threshold)

Results 306 are then passed to a predication validation process 116A. In certain example embodiments, this may be a manual process where the results are reviewed by a human that validates the confirmed instances of the label (e.g., documents 1-14 from the above table). The validation performed at 116A is used to produce a dataset 310, which are instances where the label has been confirmed to be applied against the corresponding documents. The following is an example dataset:

TABLE 7

| | |
|---|---|
| Document 1 | 1 |
| Document 2 | 1 |
| Document 3 | 1 |
| Document 4 | 0 |
| Document 5 | 1 |
| Document 6 | 1 |
| Document 7 | 1 |
| Document 8 | 0 |
| Document 9 | 1 |
| Document 10 | 0 |
| Document 11 | 1 |
| Document 12 | 0 |
| Document 13 | 1 |
| Document 14 | 1 |

As shown in the above table, not all of the documents that the machine learned model 302 identified as having the label were validated as such. This generally reflects the possibility of having false positives within the labeled results 306. In any event, dataset 310 is then stored back to storage 102.

The updated labeling for the documents may then be used to retrain or update model 302 via a retraining process 312 on a periodic basis (e.g., weekly, monthly, quarterly, etc.).

Model 302 may also be archived to storage 102. This may also include any errors or other data generated during processing of a model with new data. Model validation process 114A checks the models and generates an error log 308 for any inconsistencies that may be generated by the model 302. For example, by checking the performance metrics of the model (e.g., by assessing its recall metric or other metric). If the model does not meet or exceed performance expectations then an error may be thrown and written to a log file for further follow-up.

The processing discussed in connection with FIG. 3 may be performed for each model (and dataset) that is used in each of the processing instances that are deployed as part of computer system 100 that is used to handle multi-label processing. Thus, for example, the results of applying documents to a model to identify, for example, potential and announced labels will generate different output than applying documents to a model that has been trained to predicate ongoing and closed labels. Moreover, as discussed in greater detail herein, different models may use different generated thresholds to determine what model predication values may be translated into a positive label classification.

Description of FIG. 4

FIG. 4 is a process diagram that shows how a model is trained and then used to subsequently make predictions on new data according to certain example embodiments. In certain example embodiments, the processing shown in FIG. 4 may be executed for each of the models (e.g., to generate those models) that are used in the respective processing instances shown in FIG. 1.

At 402, training documents are retrieved from storage 102. This may include loading documents previously labeled as a result of prior processing by a model. In such a case an existing model may be retrained.

At 404, the training documents are filtered. Filtering may include, for example, consolidating documents or removing older documents from the dataset (or only documents that satisfy a given date range). Other types of filtering may also be applied to tailor the dataset that is used to train (or retrain) the model.

At 406, natural language preprocessing functions are executed against the documents. This may include, for example lemmatizing the documents or the like. It will be appreciated that the types of preprocessing performed may vary based on the nature of the dataset. For example, if the dataset includes images then preprocessing may be different than if the dataset includes textual documents. The NLP preprocessing at 406 may also be used when processing new or test documents against a model that is trained according to the processing described in connection with 402-420.

At 408, the training set is balanced.

At 410, TFIDF (term frequency-inverse document frequency) vectorizing is performed on the dataset. Again, as with step 406, the type of processing here may vary based on the nature of the dataset. In the case of textural documents, this process assists in determining how important a word is to a document in a collection or corpus of documents. For example, if a given word is prevalent in one document, but not the corpus (e.g., across the dataset), then that word may be weighted as being relatively more important to that given document. In certain example embodiments, this may be performed as a unigram (e.g., across the words of a document). In other examples, a bigram may be used. In other examples (e.g., images) different types of processing may be used depending on the nature of the application or problem to be addressed by the system.

At 412, a vocabulary is created. This may be based on a balanced training set. The TFIDF vectorizing and/or the created vocabulary may be encapsulated or used as functionality within the wrapper function that is created for handling the testing of documents.

At 414, features selection is performed. This may be, for example, L1-based (e.g., penalizes the sum of absolute values of the coefficients) feature selection in a support vector machine (SVM). The model that is generated for selected features at 414 is then used as the feature selection model at 434 as part of wrapper function 450.

At 416, the model is trained. In certain example embodiments, this may be based on a linear SVM with recall. The trained model may be stored as the predication model and accessed at 436 as part of the wrapper function 450.

At 418, predications are performed (e.g., the probability of a "mandate" signal being found in the documents).

At 420, optimization is performed where an optimal threshold is determined for translating the probability value that is output from the model into a binary signal. The results of the optimization determination may then be incorporated or accessed by the optimizer at 438 as part of the wrapper function 450.

In certain example embodiments, a threshold value may be derived by using a grid search or the like. This may be accomplished by, for example, stepping between 0 and 1 by 0.001 and using, for example, balanced accuracy as a metric to be maximized. Different metrics may be used when determining the threshold for the different models. For example, one model (112A) may seek to maximize recall, and another model (112B) may use balanced accuracy. In other words, the different models that are deployed across the processing instances may be tuned according to different metrics depending on application need. By using this technique different threshold values may be determined for each of the models that are used by the system that is performing a multi-label process.

As an example scenario, over a 1000 documents were analyzed for mandate signals. The following is the results of using a 50 percent threshold (e.g., those signals with more than 50 percent probability are assigned "Yes" for a mandate signal).

TABLE 8

| 50% Threshold | | Predicated | |
|---|---|---|---|
| | | No | Yes |
| Actual | No | 2544 | 474 |
| | Yes | 160 | 460 |

The following results for the same dataset predications were then performed with a 44.1% threshold.

TABLE 9

| 44.1% Threshold | | Predicated | |
|---|---|---|---|
| | | No | Yes |
| Actual | No | 2229 | 789 |
| | Yes | 61 | 559 |

As shown from the above two tables, a recall metric of 0.74 was calculated by using a 0.5 threshold value. However, with the same predications and a different threshold (e.g., a calculated threshold of 44.1) different results were achieved. Using the above technique (e.g., by maximizing the balanced accuracy metric), the recall metric was improved to 0.9 when a threshold of 0.441 was used. Accordingly, the dynamic nature of the calculation of the threshold can be used to help assist the end result performance of one or more models that are used by the system 100. Furthermore, as models are retrained by using newly labeled data, the threshold values may be recalculated. Accordingly, each model may be paired with its own threshold value that is used to translate the predication values into binary values that are then used to assign labels to a given dataset. While certain models may use calculated thresholds one or more models may use preset threshold in certain example embodiments.

Once the training documents (or other data) have been processed through the processing discussed in connection with 402-420, the various outputs from that processing (e.g., the trained model) may then be accessed via a wrapper function 450 that may encapsulate functionality (e.g., as discussed above) for using the trained model to generated a report 440. Accordingly, the wrapper function 450 may be called and used in connection with testing documents 428. The output from the wrapper function may be, for example, data that is similar in nature to that shown in Tables 6 or 7 above.

Description of FIG. 5

FIG. 5 is a diagram of a system that is used to (re)train models and make classification predications according to certain example embodiments. FIG. 5 may represent a more detailed view of the software modules that are used to perform the processing discussed in FIG. 4 and as described in connection with FIG. 3 and/or each processing instance of FIG. 1.

The two top-level software modules that are shown in FIG. 5 include a retraining module 500 (which may also function as a "training" module) and a predication module 550. Retraining module 500 and predication module 550 may be software packages or code that can be executed by a computing device (e.g., computing device 600). In certain examples, each processing instance (e.g., as shown in FIG. 1) may instantiate retraining module 500, predication module 550, or both retraining module 500 and predication module 550. Accordingly, the software code provided by these modules may be reused across the various processing instances that are operating on or with different models.

Each instance of storage 102 in FIG. 5 may be, for example, implemented using S3 that is available on AWS. These may be separately provided from each module. In other words, each storage reference in FIG. 5 may be viewed as accessing storage of data by a corresponding process that is part of the module. In certain examples, all data may be stored in S3 (or the another type of storage such as a database or the like) or different data may be stored differently.

In any event, retraining module 500 includes document search engine 510 that is used to access documents stored in storage 102. This may also include retrieving prior predication information for those documents in connection with review sheet 562 (e.g., which may be similar to the format shown in table 7 above). The document search engine 510 may be used to find new documents based on document names, pre-process, and make a data frame of new documents that will be used for retraining purposes. The new data frames that are generated by the document search engine 510 may then be saved back to storage 102 and/or passed onto a corpus-based incremental learning module 512.

The corpus-based incremental learning module 512 includes data merging 514, balancing 516, and vectorizing 518. These modules may comprise the functionality discussed in connection with steps 408, 410, and 412 of FIG. 4.

Once a corpus is created by the corpus-based incremental learning module 512 it may then be saved to storage 102 and/or passed on to the feature selection module 520.

The feature selection module 520 may correspond to the processing discussed in connection with 414 of FIG. 4. The feature selection model that is generated by the feature selection module 520 may be stored to storage 102 and/or passed onto classification module 522.

The classification module 522 may be used to generate a classification model. The processing performed by the classification module 522 may correspond to the processing performed by step 416 in FIG. 4. The generated classification model may be saved to storage 102.

Each model that is generated may then be passed to the optimizer module 524, which may execute the functionality discussed in connection with 420 of FIG. 4. The threshold that is generated by the optimizer module 524 may be stored to storage 102 in association with the corresponding model. In other words, each model have a corresponding generated threshold value that is unique, semi-unique, or otherwise based on the corresponding model.

The model generated by the classification module 522 and/or the threshold generated by the optimizer may then be passed to the performance checking module 526 that checks the performance of the model. The performance check module 526 checks the performance of the generate model (and its associated threshold) to ensure that performance of the model is sufficient for use in predicting labels for new data. The performance analysis of the model may include, for example, calculating the accuracy, balanced accuracy, and/or recall metrics of the model. This information may be stored to storage 102 and an error generated if the metrics do not exceed one or more metric thresholds (e.g. achieving a recall metrics of at least 0.8, 0.85, 0.9, 0.91, 0.92, 0.95, etc.).

These modules, as noted above, may be wrapped into the (re)training module 500 and used to train or retrain models that are then used to make predictions by using the predication module 550.

The predication module 550 may encapsulate functionality for handling preprocessing, vectorization, feature selection, and/or classification. Accordingly, the predication module 550 may be executed when predications (e.g., whether a given label is to be assigned to a given piece of data) are to be made on newly arriving data. Specifically, new documents 548 may be periodically (e.g., on an hourly, daily, weekly, or the like basis) added to storage 102. The predication module 550 may then load these documents for processing.

Preprocessing module 552 performance preprocessing functions and may be similar in functionality to the processing discussed in connection with 430 in FIG. 4.

Documents (or other data) may then be passed to the vectorizing module 554 that pulls the latest vectorizer (e.g., the corpus) generated by the retraining module 500 for the model that the data will be processed against.

Similarly, the feature selection module 556 will retrieve the latest feature selector generated by the retraining module 500 for the model that will be used. This will be used by the feature selection module to select the feature that will be used when performing the classification task for the selected model.

The classification module 558 also retrieves the classification model (e.g., the last one generated) and then performs the classification task for the prepared dataset (e.g., the new documents 548).

The output from the classification module 558 may be similar to the data shown in connection with Table 6 where a predication probability of the presence of a given label may be assigned to each document (or other piece of data).

The probability value is then run against the determined threshold (e.g., an optimized threshold) that is associated with the given classification model to output a binary value into a predication report 560. The report 560 may then be reviewed (e.g., either manually or via automated processing) to generate a review sheet 562 that is stored back to storage 102. The newly labeled documents may then form the basis for yet further training (e.g., incremental learning) for future classification models (which each have a corresponding determined threshold).

The predication module 550 and/or the (re)training module 500 may be executed for each processing instance (e.g., 110A-110D) and load the corresponding model (e.g., 112A-112D) for that processing instance. Accordingly, the codebase of the predication module 550 and (re)training module 500 may be repeatedly reused in connection with differently trained models.

In certain examples, the processing performed by the predication module (across the processing instances). Thus, the overall process may run hierarchically such that a first pass of the documents is taken by processing instance 110A. Those documents (106A) that are identified as having the sought after label (e.g., "mandate" as shown in FIG. 2B) are then passed to a further processing instance 110B. Processing instance 110B may then run a different labeling task to identify documents that have early (e.g., 108A) and/or late (e.g., 108B) signals in them. Notably, such labeling may not be mutually exclusive and thus a document may be labeled with both B1 and B2.

In certain example embodiments, labeling a document with more than one label (e.g., B1 and B2) may be additionally based on a difference in probabilities for the labels determined by the respective model. For example, if the model determines a 0.6 probability for the B1 label and a 0.65 probability for the B2 label then the processing may label the given document with both the B1 and B2 labels based on the respective probabilities being within a distance of each other (e.g., with 0.05 or 0.1, etc.). However, if the B1 label is determined to have a probability that is greater than the B2 probability by more than the distance (e.g., it is more than a 0.05 or 0.1 distance between the two), then the document may only be assigned the B1 label. This is even if the B2 probability is greater than the associated optimized threshold for that model (e.g., model 112B in this case). Accordingly, whether a given label is applied to a given piece of data (e.g., a document) may also be based on how close (e.g., within 5%, 10%, etc.) the probability score for that given label is to the probability score of another label that is determined by the same model.

In any event, the results of the labeling process from processing instance 110B may then passed onto processing instances 110C and/or 110D that operate to identify potential/announced and ongoing/closed labels. Specifically, the documents determined to have the B1 label (108A) are passed on and used as input for processing instance 110C. Similarly, the documents determined to have the B2 label (108B) are passed on and used as input for processing instance 110D. Again, these labels may be non-mutually exclusive. But in certain example embodiments, the sought after labels may be mutually exclusive (e.g., mandate vs non-mandate). As such, both types of classification may be supported depending on the nature of the classification.

As shown in FIG. 1 (and in connection with FIG. 2B), the processing instances (and their corresponding models) may operate in a hierarchical manner such that the output from one of the processing instances is used as input to another. In certain example embodiments, the computer system may include at least three levels in the hierarchical structure of the processing instances (and their corresponding models). Accordingly, for example, at least two models/processing instances may operate on data that has been already labeled or paired down by a "parent" processing instance/model. For example, processing instance 110B uses documents 106A that have classified as having the A2 label. As discussed herein, this allows for model 112B to operate on a data space that is less noisy because it does not have to process documents that have been classified as A1 (documents 106B).

In certain example embodiments, the processing instances 110A-110D may instead be the "same" processing instance that is re-used with a different classification model. Thus, for example, a computing device 600 may load model 112A and generate results that are stored. The same computing device 600 may then load model 112B and use the stored results as input for processing against the next model. Similarly, a signal virtual environment or container may be reused with different models and different input data. Thus, the training module 500 and/or predication module 550 may be rerun with different input documents and different classification models to effectively operate in a hierarchical manner by using the "same" processing instance over time.

By using the system described in connection with the label arrangement shown in FIG. 2B, performance may be relatively increased over a system that operates in accordance with multi-label classification that operates as shown in FIG. 2A. For example, a recall metric of 0.90 was calculated for the same set for documents using the technique described in connection with FIG. 1 and FIG. 2B vs. recall metrics shown in Tables 4 and 5 (e.g., where the recall metric was around 0.6 or below). Similarly, the balanced accuracy metric of this type of implementation achieved a value of 0.82, which was an improvement over the single model approach shown in tables 4 and 5.

Description of FIG. 6

FIG. 6 is a block diagram of an example computing device 600 (which may also be referred to, for example, as a "computing device," "computer system," or "computing system") according to some embodiments. In some embodiments, the computing device 600 includes one or more of the following: one or more processors 602; one or more memory devices 604; one or more network interface devices 606; one or more display interfaces 608; and one or more user input adapters 610. Additionally, in some embodiments, the computing device 600 is connected to or includes a display device 612. As will explained below, these elements (e.g., the processors 602, memory devices 604, network interface devices 606, display interfaces 608, user input adapters 610, display device 612) are hardware devices (for example, electronic circuits or combinations of circuits) that are configured to perform various different functions for the computing device 600.

In some embodiments, each or any of the processors 602 (which may also be referred to as hardware processors) is or includes, for example, a single- or multi-core processor, a microprocessor (e.g., which may be referred to as a central processing unit or CPU), a digital signal processor (DSP), a microprocessor in association with a DSP core, an Application Specific Integrated Circuit (ASIC), a Field Programmable Gate Array (FPGA) circuit, or a system-on-a-chip (SOC) (e.g., an integrated circuit that includes a CPU and other hardware components such as memory, networking interfaces, and the like). And/or, in some embodiments, each or any of the processors 602 uses an instruction set architecture such as x86 or Advanced RISC Machine (ARM). In certain instances, each, any, or all of the processors 602 within a computing device may be referred to as (e.g., collectively) a processing system. In certain examples, processing systems may span multiple computing devices (e.g., as a distributed processing system).

In some embodiments, each or any of the memory devices 604 is or includes a random access memory (RAM) (such as a Dynamic RAM (DRAM) or Static RAM (SRAM)), a flash memory (based on, e.g., NAND or NOR technology), a hard disk, a magneto-optical medium, an optical medium, cache memory, a register (e.g., that holds instructions), or other type of device that performs the volatile or non-volatile storage of data and/or instructions (e.g., software that is executed on or by processors 602). Memory devices 604 are examples of non-transitory computer-readable storage media.

In some embodiments, each or any of the network interface devices 606 includes one or more circuits (such as a baseband processor and/or a wired or wireless transceiver), and implements layer one, layer two, and/or higher layers for one or more wired communications technologies (such as Ethernet (IEEE 802.3)) and/or wireless communications technologies (such as Bluetooth, WiFi (IEEE 802.11), GSM, CDMA2000, UMTS, LTE, LTE-Advanced (LTE-A), and/or other short-range, mid-range, and/or long-range wireless communications technologies). Transceivers may comprise circuitry for a transmitter and a receiver. The transmitter and receiver may share a common housing and may share some or all of the circuitry in the housing to perform transmission and reception. In some embodiments, the transmitter and receiver of a transceiver may not share any common circuitry and/or may be in the same or separate housings.

In some embodiments, each or any of the display interfaces 608 is or includes one or more circuits that receive data from the processors 602, generate (e.g., via a discrete GPU, an integrated GPU, a CPU executing graphical processing, or the like) corresponding image data based on the received data, and/or output (e.g., a High-Definition Multimedia Interface (HDMI), a DisplayPort Interface, a Video Graphics Array (VGA) interface, a Digital Video Interface (DVI), or the like), the generated image data to the display device 612, which displays the image data. Alternatively or additionally, in some embodiments, each or any of the display interfaces 608 is or includes, for example, a video card, video adapter, or graphics processing unit (GPU).

In some embodiments, each or any of the user input adapters 610 is or includes one or more circuits that receive and process user input data from one or more user input devices (not shown in FIG. 6) that are included in, attached to, or otherwise in communication with the computing device 600, and that output data based on the received input data to the processors 602. Alternatively or additionally, in some embodiments each or any of the user input adapters 610 is or includes, for example, a PS/2 interface, a USB interface, a touchscreen controller, or the like; and/or the user input adapters 610 facilitates input from user input devices (not shown in FIG. 6) such as, for example, a keyboard, mouse, trackpad, touchscreen, etc.

In some embodiments, the display device 612 may be a Liquid Crystal Display (LCD) display, Light Emitting Diode (LED) display, or other type of display device. In embodiments where the display device 612 is a component of the computing device 600 (e.g., the computing device and the display device are included in a unified housing), the display device 612 may be a touchscreen display or non-touchscreen display. In embodiments where the display device 612 is connected to the computing device 600 (e.g., is external to the computing device 600 and communicates with the computing device 600 via a wire and/or via wireless communication technology), the display device 612 is, for example, an external monitor, projector, television, display screen, etc.

In various embodiments, the computing device 600 includes one, or two, or three, four, or more of each or any of the above-mentioned elements (e.g., the processors 602, memory devices 604, network interface devices 606, display interfaces 608, and user input adapters 610). Alternatively or additionally, in some embodiments, the computing device 600 includes one or more of: a processing system that includes the processors 602; a memory or storage system that includes the memory devices 604; and a network interface system that includes the network interface devices 606.

The computing device 600 may be arranged, in various embodiments, in many different ways. As just one example, the computing device 600 may be arranged such that the processors 602 include: a multi (or single)-core processor; a first network interface device (which implements, for example, WiFi, Bluetooth, NFC, etc.); a second network interface device that implements one or more cellular communication technologies (e.g., 3G, 4G LTE, CDMA, etc.); memory or storage devices (e.g., RAM, flash memory, or a hard disk). The processor, the first network interface device, the second network interface device, and the memory devices may be integrated as part of the same SOC (e.g., one integrated circuit chip). As another example, the computing device 600 may be arranged such that: the processors 602 include two, three, four, five, or more multi-core processors; the network interface devices 606 include a first network interface device that implements Ethernet and a second network interface device that implements WiFi and/or Bluetooth; and the memory devices 604 include a RAM and a flash memory or hard disk.

As previously noted, whenever it is described in this document that a software module or software process performs any action, the action is in actuality performed by underlying hardware elements according to the instructions that comprise the software module. Consistent with the foregoing, in various embodiments, each or any combination of the computer system 100, processing instances 110A-110D, model validation 114A, predication validation 116A, retraining process 312, training module 500, predication module 550, each of which will be referred to individually for clarity as a "component" for the remainder of this paragraph, are implemented using an example of the computing device 600 of FIG. 6. In such embodiments, the following applies for each component: (a) the elements of the 600 computing device 600 shown in FIG. 6 (i.e., the one or more processors 602, one or more memory devices 604, one or more network interface devices 606, one or more display interfaces 608, and one or more user input adapters 610), or appropriate combinations or subsets of the foregoing) are configured to, adapted to, and/or programmed to implement each or any combination of the actions, activities, or features described herein as performed by the component and/or by any software modules described herein as included within the component; (b) alternatively or additionally, to the extent it is described herein that one or more software modules exist within the component, in some embodiments, such software modules (as well as any data described herein as handled and/or used by the software modules) are stored in the memory devices 604 (e.g., in various embodiments, in a volatile memory device such as a RAM or an instruction register and/or in a non-volatile memory device such as a flash memory or hard disk) and all actions described herein as performed by the software modules are performed by the processors 602 in conjunction with, as appropriate, the other elements in and/or connected to the computing device 600 (i.e., the network interface devices 606, display interfaces 608, user input adapters 610, and/or display device 612); (c) alternatively or additionally, to the extent it is described herein that the component processes and/or otherwise handles data, in some embodiments, such data is stored in the memory devices 604 (e.g., in some embodiments, in a volatile memory device such as a RAM and/or in a non-volatile memory device such as a flash memory or hard disk) and/or is processed/handled by the processors 602 in conjunction, as appropriate, the other elements in and/or connected to the computing device 600 (i.e., the network interface devices 606, display interfaces 608, user input adapters 610, and/or display device 612); (d) alternatively or additionally, in some embodiments, the memory devices 602 store instructions that, when executed by the processors 602, cause the processors 602 to perform, in conjunction with, as appropriate, the other elements in and/or connected to the computing device 600 (i.e., the memory devices 604, network interface devices 606, display interfaces 608, user input adapters 610, and/or display device 612), each or any combination of actions described herein as performed by the component and/or by any software modules described herein as included within the component.

The hardware configurations shown in FIG. 6 and described above are provided as examples, and the subject matter described herein may be utilized in conjunction with a variety of different hardware architectures and elements. For example: in many of the Figures in this document, individual functional/action blocks are shown; in various embodiments, the functions of those blocks may be implemented using (a) individual hardware circuits, (b) using an application specific integrated circuit (ASIC) specifically configured to perform the described functions/actions, (c) using one or more digital signal processors (DSPs) specifically configured to perform the described functions/actions, (d) using the hardware configuration described above with reference to FIG. 6, (e) via other hardware arrangements, architectures, and configurations, and/or via combinations of the technology described in (a) through (e).

Technical Advantages of Described Subject Matter

In certain example embodiments, it is possible to train each model (e.g., each classifier) on a data space that is less noisy (which can be a particular problem when handling multi-label classification problems) than would otherwise be available (e.g., due to the ambiguity coming from multi-label nature of the problem at hand). The data space for training (and that is subsequently used when running a model to make predications on new data) may processed in a hierarchical manner. Thus, a model may be trained based off of how another model has classified data. That same model (e.g., once trained) may also make classification predications for the classification labels that it identifies. This may allow the model to be trained more efficiently and/or make more accurate predications because the data being processed by that model may be more relevant to the classification task for that model.

In certain example embodiments, modules (e.g., the processing instances) are repeatedly used with different models. This approach allows for chunks of similar architecture (e.g., code/processes) to be used to deal with multiple classifications of which classes in each chunk are getting granular in series.

In certain examples, a binary threshold can determined to further improve the recall or another metric that is relevant to a classification task. This can be further refined by using, for example, a grid search optimization to dynamically determine a threshold for a given model. By adjusting the threshold based on the specific model at hand (rather than just using, for example, 0.5), the final metric (e.g., the recall metric, the balanced accuracy metric, etc.) for the model can be improved.

The techniques herein also allows for models to continuously learn (e.g., incremental learning) from new documents to avoid the models becoming biased over time. This may be accomplished by validating predications from the model and then using those validated predictions to retrain the model.

In certain examples, the architecture discussed herein (e.g., computer system 100) via use of the multiple different processing instances may provide increased accuracy and/or efficiency when performing multi-label processing on datasets. For example, the recall metric that is achieved according to certain example embodiments surpasses the recall metric provided by manual level review as well as the recall metric provided by a single-model approach. For example, example embodiments have achieved a recall metric of 0.9 vs a recall metric of 0.25-0.75 for a single-model approach to multi-label classification.

Selected Terminology

Whenever it is described in this document that a given item is present in "some embodiments," "various embodiments," "certain embodiments," "certain example embodiments, "some example embodiments," "an exemplary embodiment," or whenever any other similar language is used, it should be understood that the given item is present in at least one embodiment, though is not necessarily present in all embodiments. Consistent with the foregoing, whenever it is described in this document that an action "may," "can," or "could" be performed, that a feature, element, or component "may," "can," or "could" be included in or is applicable to a given context, that a given item "may," "can," or "could" possess a given attribute, or whenever any similar phrase involving the term "may," "can," or "could" is used, it should be understood that the given action, feature, element, component, attribute, etc. is present in at least one embodiment, though is not necessarily present in all embodiments. Terms and phrases used in this document, and variations thereof, unless otherwise expressly stated, should be construed as open-ended rather than limiting. As examples of the foregoing: "and/or" includes any and all combinations of one or more of the associated listed items (e.g., a and/or b means a, b, or a and b); the singular forms "a", "an" and "the" should be read as meaning "at least one," "one or more," or the like; the term "example" is used provide examples of the subject under discussion, not an exhaustive or limiting list thereof; the terms "comprise" and "include" (and other conjugations and other variations thereof) specify the presence of the associated listed items but do not preclude the presence or addition of one or more other items; and if an item is described as "optional," such description should not be understood to indicate that other items are also not optional.

As used herein, the term "non-transitory computer-readable storage medium" includes a register, a cache memory, a ROM, a semiconductor memory device (such as a D-RAM, S-RAM, or other RAM), a magnetic medium such as a flash memory, a hard disk, a magneto-optical medium, an optical medium such as a CD-ROM, a DVD, or Blu-Ray Disc, or other type of device for non-transitory electronic data storage. The term "non-transitory computer-readable storage medium" does not include a transitory, propagating electromagnetic signal.

Additional Applications of Described Subject Matter

It will be appreciated that deep learning may be viewed as a sub-domain of machine learning. As used herein and unless otherwise indicated, aspects discussed herein that relate to "machine learning" may also be applied to "deep learning" and vice versa.

Although process steps, algorithms or the like, including without limitation with reference to FIGS. 3-5 may be described or claimed in a particular sequential order, such processes may be configured to work in different orders. In other words, any sequence or order of steps that may be explicitly described or claimed in this document does not necessarily indicate a requirement that the steps be performed in that order; rather, the steps of processes described herein may be performed in any order possible. Further, some steps may be performed simultaneously (or in parallel) despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary, and does not imply that the illustrated process is preferred.

Although various embodiments have been shown and described in detail, the claims are not limited to any particular embodiment or example. None of the above description should be read as implying that any particular element, step, range, or function is essential. All structural and functional equivalents to the elements of the above-described embodiments that are known to those of ordinary skill in the art are expressly incorporated herein by reference and are intended to be encompassed. Moreover, it is not necessary for a device or method to address each and every problem sought to be solved by the present invention, for it to be encompassed by the invention. No embodiment, feature, element, component, or step in this document is intended to be dedicated to the public.

The invention claimed is:

1. A computer system comprising:
   electronic data storage configured to store a plurality of classification models each configured to predict whether one or more labels applies to one or more members of a dataset;
   at least one hardware processor configured to:
      retrieve the dataset;
      execute a first processing instance that runs a first classification model of the plurality of classification models against the dataset to generate a first classified dataset that includes members of the dataset for which a first label has been assigned by using the first classification model;
      execute a second processing instance that runs a second classification model of the plurality of classification models by using the first classified dataset as input to generate a second classified dataset and a third classified dataset, wherein members of the second classified dataset include members of the first dataset for which a second label has been assigned by using the second classification model, wherein members of the third classified dataset include members of the first dataset for which a third label has been assigned by using the second classification model; and
      execute a third processing instance that runs a third classification model of the plurality of classification models by using the second classified dataset as input to generate a fourth classified dataset, wherein members of the fourth classified dataset include members of the second dataset for which a fourth label has been assigned by using the third classification model,
   wherein assignment of the first label is based on a classification probability value for the first label being greater than a first threshold value,
   wherein assignment of the second or third label is based on a classification probability value for the second or third label being greater than a second threshold value,
   wherein assignment of the fourth label is based on a classification probability value for the fourth label being greater than a third threshold value.

2. The computer system of claim 1, wherein each of the plurality of classification models is associated with a generated threshold value that is based on the corresponding one of the plurality of classification models.

3. The computer system of claim 2, wherein all of the plurality of classification models are associated with different threshold values.

4. The computer system of claim 2, wherein at least one of the first, second, and third threshold values are generated by using grid search.

5. The computer system of claim 1, wherein the first, second, and third processing instances are arranged in a hierarchical manner.

6. The computer system of claim 1, wherein at least one of first and third models assigns labels that are mutually exclusive.

7. The computer system of claim 1, wherein at least the second classification model assigns labels that are non-mutually exclusive, wherein the second classified dataset and the third classified dataset share at least one member that has been assigned both the second label and the third label.

8. The computer system of claim 1, wherein the at least on hardware processor is further configured to:
store validated data that has been labeled based on execution of the first, second, and/or third processing instance; and
retrain at least one of the first, second, and/or third models based on at least some of the validated data.

9. The computer system of claim 1, wherein a recall metric for labeling the dataset by using at least the first, second, or third processing instances is at least 0.90.

10. The computer system of claim 1, wherein the dataset is a group of documents and the first, second, and/or third classification models are configured to assign labels to each document in the group of documents based on natural language processing performed in connection with the group of documents.

11. The computer system of claim 1, at least one hardware processor configured to:
calculate the first threshold value based on the first classification model.

12. A computer implemented method comprising:
storing, to electronic data storage, a plurality of classification models that are each configured to predict whether one or more labels applies to a respective input dataset;
retrieving, from the electronic data storage, a dataset;
executing, on a computer system that comprising at least one hardware processor, a first processing instance that runs a first classification model of the plurality of classification models against the dataset to generate a first classified dataset that includes members of the dataset for which a first label has been assigned by using the first classification model;
executing, on the computer system, a second processing instance that runs a second classification model of the plurality of classification models by using the first classified dataset as input to generate a second classified dataset and a third classified dataset, wherein members of the second classified dataset include members of the first dataset for which a second label has been assigned by using the second classification model, wherein members of the third classified dataset include members of the first dataset for which a third label has been assigned by using the second classification model; and
executing, on a computer system, a third processing instance that runs a third classification model of the plurality of classification models by using the second classified dataset as input to generate a fourth classified dataset, wherein members of the fourth classified dataset include members of the second dataset for which a fourth label has been assigned by using the third classification model,
wherein assignment of the first label is based on a classification probability value for the first label being greater than a first threshold value,
wherein assignment of the second or third label is based on a classification probability value for the second or third label being greater than a second threshold value,
wherein assignment of the fourth label to the members is based on a classification probability value for the fourth label being greater than a third threshold value.

13. The method of claim 12, wherein each of the plurality of models is associated with a generated threshold value that is based on the corresponding one of the plurality of classification models.

14. The method of claim 13, wherein all of the plurality of classification models are associated with different threshold values.

15. The method of claim 14, wherein at least one of the first, second, and third threshold values are generated by using grid search.

16. The method of claim 12, further comprising:
validating data that has been labeled based on execution of the first, second, and/or third processing instance; and
retraining at least one of the first, second, and/or third classification models based on at least some of the validated data.

17. The method of claim 12, wherein the dataset is a group of documents and the first, second, and/or third classification models are configured to assign labels to each document in the group of documents based on natural language processing performed in connection with the group of documents.

18. A non-transitory computer readable storage medium configured to store computer-executable instructions for use with a computer system, the stored computer-executable instructions comprising instructions that cause the computer system to perform operations comprising:
storing, to electronic data storage, a plurality of classification models that are each configured to predict whether one or more labels applies to a respective input dataset;
retrieving, from the electronic data storage, a dataset;
executing, on a computer system that comprising at least one hardware processor, a first processing instance that runs a first classification model of the plurality of classification models against the dataset to generate a first classified dataset that includes members of the dataset for which a first label has been assigned by using the first classification model;
executing, on the computer system, a second processing instance that runs a second classification model of the plurality of classification models by using the first classified dataset as input to generate a second classified dataset and a third classified dataset, wherein members of the second classified dataset include members of the first dataset for which a second label has been assigned by using the second classification model, wherein members of the third classified dataset include members of the first dataset for which a third label has been assigned by using the second classification model; and
executing, on a computer system, a third processing instance that runs a third classification model of the plurality of classification models by using the second classified dataset as input to generate a fourth classified dataset, wherein members of the fourth classified dataset include members of the second dataset for which a fourth label has been assigned by using the third classification model, wherein assignment of the first label is based on a classification probability value for the first label being greater than a first threshold value, wherein assignment of the second or third label is based on a classification probability value for the second or third label being greater than a second threshold value, wherein assignment of the fourth label to the members is based on a classification probability value for the fourth label being greater than a third threshold value.

19. The non-transitory computer readable storage medium of claim 18, wherein each of the plurality of models is associated with a generated threshold value that is based on the corresponding one of the plurality of classification models.

20. The non-transitory computer readable storage medium of claim 18, wherein the operations further comprise:

validating data that has been labeled based on execution of the first, second, and/or third processing instance; and retraining at least one of the first, second, and/or third classification models based on at least some of the validated data.

* * * * *